April 30, 1968     D. B. LEWIS     3,380,441

CRANKCASE VENTILATION FLOW REGULATOR VALVE

Filed Aug. 23, 1965

INVENTOR.
Donald B. Lewis
BY
J. L. Carpenter
ATTORNEY

United States Patent Office 3,380,441
Patented Apr. 30, 1968

3,380,441
CRANKCASE VENTILATION FLOW
REGULATOR VALVE
Donald B. Lewis, Lapeer, Mich., assignor to General
Motors Corporation, Detroit, Mich., a corporation of
Delaware
Filed Aug. 23, 1965, Ser. No. 481,716
3 Claims. (Cl. 123—119)

ABSTRACT OF THE DISCLOSURE

A flow regulator valve for the crankcase ventilation system of an internal combustion engine wherein a conical plunger connected to a manifold pressure-responsive diaphragm cooperates with an outlet orifice to regulate the flow of blowby gases. The plunger and the orifice are dimensioned so as to maintain an annular flow area in the ventilation system under all operating conditions.

During operation of an internal combustion engine, unburned fuel and contaminant containing gases, known as blowby, are blown past the pistons and into the crankcase. It is desirable to prevent the release of these gases into the atmosphere through the crankcase air vent or through other crankcase leakage points. They are therefore commonly routed into the induction system of the engine where they combine with the air-fuel mixture and return to the cylinders to be burned. The usual method of accomplishing this is by utilizing the pressure differential which exists between the intake manifold and the crankcase to draw the blowby gases from the crankcase into the intake manifold.

The pressure differential and thus the gas drawing power is greatest when the intake manifold is at its highest vacuum. This occurs when the engine is idling or under low load conditions. However, the amount of blowby is small under idling or low load conditions but increases rapidly as the engine speed or load increases. Thus, it is necessary to provide a valve in the crankcase ventilation system to control removal of all blowby gases under all load conditions and yet not cause large amounts of fresh air to be drawn from the crankcase air vent to the intake manifold and upset the air-fuel ratio of the engine under low load conditions.

Valves used in the past have not been entirely satisfactory for various reasons. Some malfunction because varnish and sludge accumulations clog the valve and render it inoperative. Others, while not subject to clogging, have insufficient capacity, because of structural limitations, to handle high blowby gas flow rates and yet be compatible with good engine operation under low load conditions when blowby gas flow rates are small.

The valve of this invention properly handles blowby gas volumes for all load conditions and for all engine classes and is not subject to clogging due to varnish or sludge accumulations. In its preferred embodiment, the regulator valve includes a housing divided into two chambers by a resilient diaphragm mounting a tapered valve member of continuously varying cross sectional area. One chamber is atmospherically pressurized and the other chamber has an inlet opening and an outlet orifice connected respectively to the crankcase and the intake manifold. Pressure differential between the two chambers moves the diaphragm and valve member toward and away from the outlet orifice. At low speeds and light loads, the valve member moves within the outlet orifice to reduce the flow area thereof. At high speeds or heavy loads, when the blowby gas flow rate is the highest, the valve member is completely withdrawn from the orifice, allowing unrestricted gas flow therethrough. A flow rate through the orifice in excess of the blowby flow rate will cause a vacuum to occur in the crankcase which acts upon the diaphragm and draws the valve member deeper into the orifice, thus throttling the flow therethrough until a balance is reached between the blowby and the orifice flow rates.

Accordingly, it is an object of this invention to provide an improved flow regulator valve for use in internal combustion engine crankcase ventilation systems.

Another object of this invention is to provide such a valve having means for controlling the flow rate therethrough in accordance with the blowby gas flow rate under all engine operating conditions.

A further object of the invention is to provide such a valve which is not subject to clogging by varnish or sludge accumulations.

Yet another object of the invention is to provide such a valve which is responsive to crankcase pressure variations and intake manifold pressure variations to balance the blowby gas flow rate therethrough.

The objects of this invention will be made apparent through the following detailed description taken in conjunction with the accompanying drawing in which.

Figure 1:
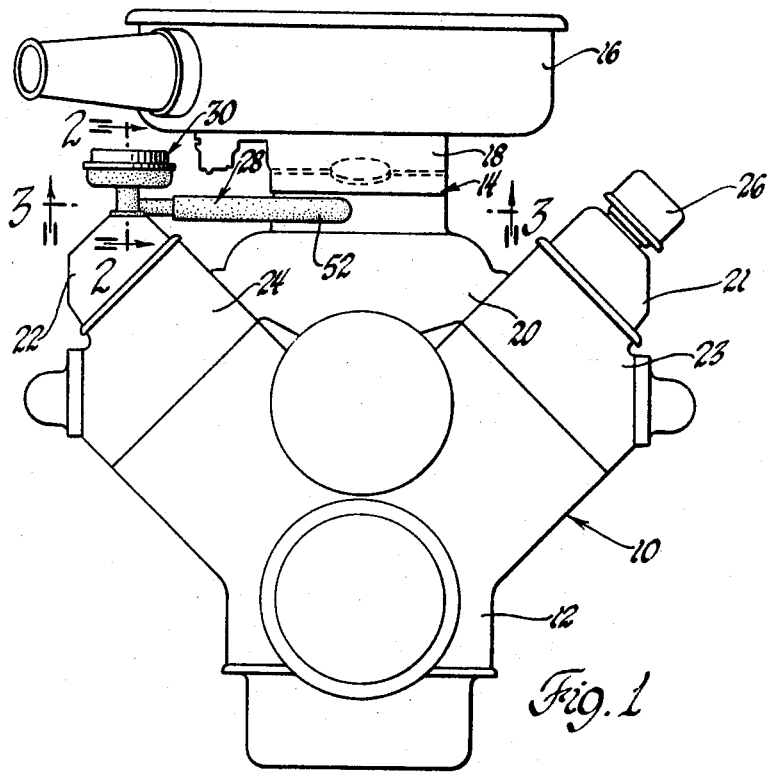
FIGURE 1 is an elevational view of a conventional internal combustion engine embodying a crankcase ventilation flow regulator valve according to this invention.

Referring to FIGURE 1, a conventional internal combustion engine 10 includes a crankcase 12 and an induction system 14 which encompasses an air cleaner assembly 16, a carburetor 18, and an intake manifold 20. Rocker arm covers 21 and 22 are fastened atop cylinder banks 23 and 24 in a conventional manner and a limited flow breather cap 26 is secured about an opening in the top of rocker arm cover 21. Fresh air entering through the breather cap 26 is admitted to the crankcase 12 through the various passageways within the interior of the engine and mixes with blowby gases which are blown past the pistons and into the crankcase.

A crankcase ventilation system designated generally 28 interconnects the crankcase 12 and the intake manifold 20 and draws blowby gases from the crankcase to the intake manifold during engine operation. The blowby gases combine with the air-fuel mixture in the intake manifold and are thereafter burned with this mixture in the engine. The ventilation system 28 includes a flow regulator valve 30 according to this invention to control the flow of the blowby gases from the crankcase to the intake manifold.

Figure 2:
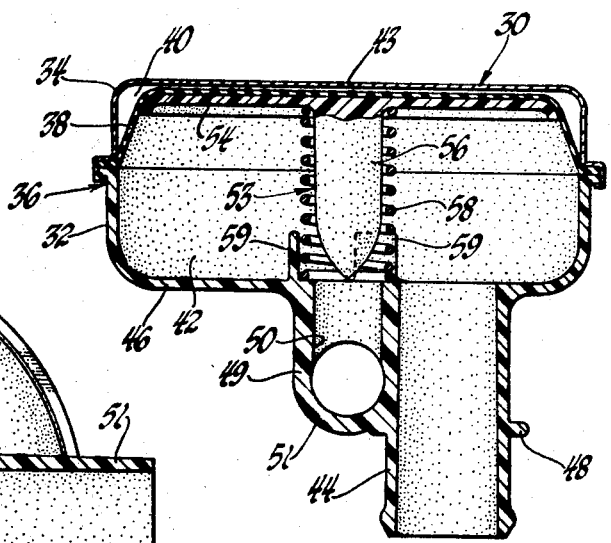
FIGURE 2 is an enlarged partially broken away view of the regulator valve taken generally along the plane indicated by line 2—2 of FIGURE 1.
Figure 3:
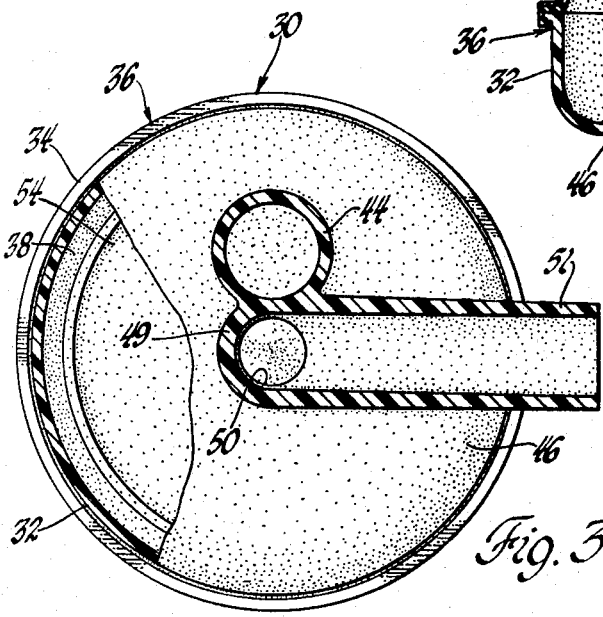
FIGURE 3 is an enlarged partially broken away view of the regulator valve taken generally along the plane indicated by line 3—3 of FIGURE 1.

The regulator valve 30, as shown in FIGURE 2, includes a flanged plastic base 32 and a flanged cap 34 crimped to the base flange to form a housing 36. A resilient diaphragm 38 has its periphery clamped between the base and the cap flanges and divides the housing 36 into two chambers 40 and 42. A hole 43 in cap 34 vents the chamber 40 to atmosphere so that the diaphragm 38 is atmospherically pressurized on one side. A gas inlet tube 44 is formed integrally with the base 32 and extends perpendicularly to the base wall 46. The inlet tube connects the chamber 42 with the crankcase. A peripheral flange 48 of the inlet tube locates the valve 30 atop the rocker arm cover 22. A gas outlet tube 49, also formed integrally with the base 32, is centrally located in wall 46 and adjacent to inlet tube 44, with a common wall therebetween. The outlet tube 49 defines an outlet orifice 50 located opposite the diaphragm 38. A third tube 51, which is located normal to outlet tube 49 and may be considered an extension thereof, connects the chamber 42 with the intake manifold 20 through the outlet orifice 50 and the tube 52.

Positioned directly above the orifice 50 and within the chamber 42 is a poppet valve 53 which consists of a plate 54 seating against the diaphragm 38 so that the valve 53 is movable therewith and a plunger 56 of continuously varying cross-sectional area. The largest diameter of the plunger 56 is somewhat smaller than the diameter of the orifice 50 so that, if the plunger is moved to its full length within the orifice, it never seats in the orifice nor completely seals off the flow area thereof. A light compression spring 58 encircles but does not contact the plunger 56 and seats on the plate 54 at the base of the plunger 56 and around the mouth of the orifice 50. A plurality of prongs 59 extend upwardly from the bottom wall 46 and surround the spring to hold it in proper position. The spring 58 biases the diaphragm 38 and the valve 53 away from the orifice 50 and at its fully extended position holds the plunger 56 clear of the orifice so that the flow area therethrough is unrestricted. Since the spring tends to bias the valve outwardly and the manifold vacuum tends to draw the valve inwardly toward the orifice, it is evident that the spring must have a spring rate which will cooperate with the variable manifold vacuum to provide the proper amount of flow area through the orifice. A properly contoured and dimensioned plunger is also essential to the establishment of proper flow area. In addition, flow area between the spring coils must always be greater than the flow area through the orifice so that the spring will never act as a restriction to flow.

When the engine is idling or at low speed and load, a vacuum as high as 20 inches may exist in the intake manifold 20 and orifice 50. Under these conditions, however, only a small amount of blowby gases are present in the crankcase 12 and therefore only a low flow rate is desired through the regulator valve 30. The diaphragm is acted upon by a pressure differential of atmospheric pressure on one side and manifold vacuum on the other side and is thereby depressed, compressing the spring 58 and moving the plunger 56 into the orifice 50. The plunger closes off most of the flow area of the orifice, thus allowing only a small flow of gas to be drawn therethrough and into the intake manifold 20. As the speed or load on the engine increases, the manifold vacuum decreases, reducing the diaphragm deflection and causing the plunger to gradually withdraw from the orifice.

At high speed or under heavy load, the manifold vacuum decreases, approaching atmospheric pressure, and may be as low as one inch Hg. At this low vacuum the pressure differential between the intake manifold and the crankcase is small, but the blowby gas flow rate is very high. It is therefore necessary that the orifice 50 be unrestricted to allow a high flow rate therethrough. Under such conditions the low manifold vacuum has little effect on the diaphragm 38 and the spring 58 will bias the diaphragm and the plunger 56 away from the orifice 50. Proper design permits the plunger to be completely withdrawn from the orifice under such conditions, allowing an unobstructed flow path through the orifice. FIGURE 2 is representative of this condition.

An important feature of the invention is the effect of crankcase pressure on the valve 30. The crankcase 12 is normally at near atmospheric pressure and preferably at a slight vacuum so that a small but continuous amount of fresh air may be drawn into the crankcase through the limited flow breather cap 26 to aid in purging the crankcase of the blowby gases. As the gas flow rate through the orifice catches up to and exceeds the blowby flow rate, however, the vacuum will increase in the crankcase 12 and will act on the diaphragm 38 to cause it to be drawn toward the orifice 50. This moves the plunger 56 deeper into the orifice, throttling the flow therethrough until a balance is reached between the blowby flow rate and the flow rate through the orifice.

Thus this invention provides an improved crankcase ventilation flow regulator valve.

I claim:

1. In a crankcase ventilation system of an internal combustion engine having a crankcase, an intake manifold at vacuum, and conduit means through which gases flow from the crankcase to the intake manifold, a flow regulating valve for controlling the gas flow through said conduit means comprising, a housing, a resilient diaphragm within said housing dividing said housing into two chambers, the first of said chambers having an inlet connected to said crankcase and an outlet orifice connected to said intake manifold, the second chamber being subject to ambient conditions, said diaphragm being movable in response to variations in the intake manifold vacuum, a conical plunger of continuously varying cross-sectional area movable with said diaphragm, said plunger axially aligned and cooperating with said orifice to restrict the flow area thereof upon movement of said diaphragm, said orifice having a cross-sectional area greater than the plunger cross-sectional area to maintain at all times an annular flow area through the orifice, and spring means biasing the plunger out of said orifice as the intake manifold vacuum decreases.

2. In a crankcase ventilation system of an internal combustion engine having a crankcase, an intake manifold at vacuum, and conduit means through which blowby gases flow from said crankcase to said intake manifold, a flow regulating valve for controlling the gas flow through said conduit means comprising, a housing consisting of a base and a cap, a resilient diaphragm having its periphery clamped between the base and the cap and dividing the housing into two chambers, said cap being open to the atmosphere, an outlet tube connecting the first of said chambers to said intake manifold and defining an outlet orifice oppositely disposed from said diaphragm, an inlet tube located adjacent to said outlet tube and connecting said first chamber to said crankcase so that gases from said crankcase enter said first chamber, said diaphragm being movable in response to variable pressure differential across said diaphragm, a conical plunger of continuously varying cross-sectional area movable with said diaphragm, said plunger axially aligned and cooperating with said orifice to restrict the flow area thereof upon movement of said diaphragm, said orifice having a cross-sectional area greater than the plunger cross-sectional area to maintain at all times an annular flow area through the orifice, said plunger being positionable within the orifice by said diaphragm in response to the pressure differential so that the available flow area through the orifice is directly proportional to the amount of blowby gases available to be drawn from the crankcase, and spring means located in said first chamber between said base and said diaphragm biasing the plunger out of said orifice as the intake manifold vacuum decreases.

3. A flow regulating valve for controlling blowby gas flow in a crankcase ventilation system of an internal combustion engine having a crankcase normally at a slight vacuum and an intake manifold at a variable vacuum, said valve comprising, a housing, a resilient diaphragm within said housing dividing said housing into two chambers, the first of said chambers having an inlet tube connected to said crankcase and an outlet tube defining an outlet orifice and connected to said intake manifold, the second chamber being open to the atmosphere, said diaphragm being movable in response to intake manifold and crankcase pressures on the first chamber side, a conical plunger of continuously varying cross-sectional area movable with said diaphragm, said plunger axially aligned and cooperating with said orifice to restrict the flow area thereof upon movement of said diaphragm, said plunger and said orifice being dimensioned so that an annular orifice flow area is established that varies in direct relation with the amount of blowby gases available to be drawn into the intake manifold, and spring means biasing said plunger out of said orifice to increase the orifice flow area as the intake manifold or the crankcase vacuum decreases.

References Cited

UNITED STATES PATENTS

| 1,919,696 | 7/1933 | George | 137—517 X |
| 2,359,485 | 10/1944 | Lowther | 123—119 |
| 2,775,960 | 1/1957 | Druzynski | 123—119 |
| 3,105,477 | 10/1963 | Lowther | 123—119 |
| 3,144,011 | 8/1964 | Anthes | 123—119 |
| 3,144,044 | 8/1964 | Anthes | 123—119 |
| 3,263,699 | 9/1966 | Givler | 123—119 |

FOREIGN PATENTS 758,332  11/1933  France.

AL LAWRENCE SMITH, *Primary Examiner.*

MARK NEWMAN, *Examiner.*